UNITED STATES PATENT OFFICE.

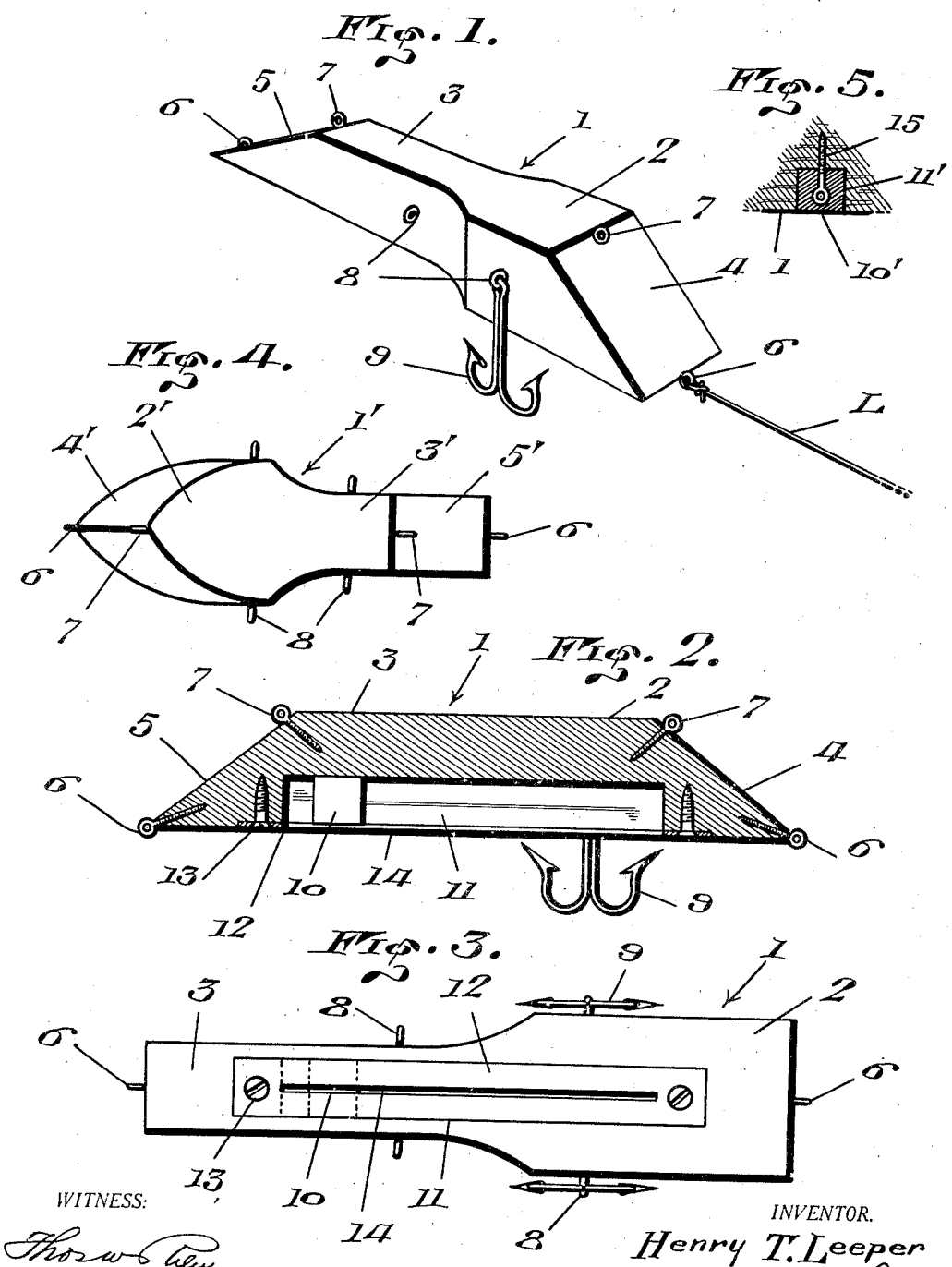

HENRY T. LEEPER, OF FREDONIA, KENTUCKY.

ARTIFICIAL BAIT.

1,394,313.     Specification of Letters Patent.     Patented Oct. 18, 1921.

Application filed November 14, 1919. Serial No. 338,049.

*To all whom it may concern:*

Be it known that I, HENRY T. LEEPER, a citizen of the United States, residing at Fredonia, in the county of Caldwell and State of Kentucky, have invented certain new and useful Improvements in Artificial Baits; and I do hereby declare the following to be a full, clear, and exact description of the invention, such as will enable others skilled in the art to which it appertains to make and use the same.

The present invention relates to artificial bait, such as are used for catching fish, and the invention has for its object the provision of a bait body of novel form and provided with means for the attachment of a line, in order that the body will dive and move through the water in such a manner as to closely resemble the movement of a minnow or small fish as when pursued, so that the bait provides an attractive lure for the larger fish.

Another object is the provision of such a bait which has opposite ends so formed that either end can be disposed forward, providing for different actions of the bait when drawn through the water, to suit the requirements.

A further object is the provision of such a bait which can be made to dive in the water or skip on the surface thereof.

A still further object is the provision of an adjustable weight carried by the bait body to regulate the motion thereof in the water.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a perspective view of the bait.

Fig. 2 is a longitudinal vertical section thereof.

Fig. 3 is a bottom plan view of the bait.

Fig. 4 is a plan view of a modified form.

Fig. 5 is a sectional detail showing a modified form of weight.

The body 1 of the bait is of wood or other buoyant material, and can be conveniently cut from a block or stick of wood, the upper and lower surfaces and sides being flat. The body is wider at one end, as at 2, than at the other end, as at 3, and the body is provided with the inclined ends or surfaces 4 and 5 at the wide and narrow ends, respectively. Screw eyes or eyelets 6 and 7 are secured to the ends of the body at the lower and upper portions thereof, for the attachment of the line L and eyelets or screw eyes 8 are also secured to the sides of the body for the connection of the hooks 9 for catching the fish which attempt to bite or swallow the bait.

By the provision of the two ends of the bait, each of which is inclined, and which are of different widths, either end of the body can be attached to the line, it being apparent that when the broader end is foremost, the bait will be given a greater tendency to dive into the water when pulled by the line, whereas when the narrower end is forward, the diving action of the bait will be modified. Furthermore, due to the decrease in width of the body from one end to the other, this will also modify the lateral motion of the bait when moved through the water, the bait having a fast choppy wiggle when the narrow end is foremost, in addition to having a tendency to dive to a less depth. Thus, with the broad end foremost, the bait will have a greater motion both vertically and horizontally, and with the narrower end foremost, the bait will have a faster movement. This provides for different actions of the bait in the water, by simply turning it end for end. Furthermore, by connecting the line to the eyelet 6, the bait will have more of a tendency to stay near or on the surface of the water, whereas when it is connected to the eyelet 7, it will have a greater tendency to dive.

In Figs. 2 and 3, there is shown the weight 10 which is employed for maintaining the equilibrium of the body, to keep it from turning over. As shown, this weight is adjustable longitudinally of the body, the bottom of which has a longitudinal groove 11, in which the weight 10 is slidable. A longitudinal strip 12 is secured to the bottom of the body by means of screws 13 or the like across the mouth of the groove 11 and frictionally holds the weight to its adjusted position. This strip 12 has a longitudinal slot 14 through which a pin or other implement may be inserted for sliding the weight toward one end or the other of the body.

This enables the weight to be adjusted to different longitudinal positions, to regulate the vertical motion of the body when drawn through the water. The bait having a greater tendency to dive when the weight is adjusted forwardly, and a tendency to skip on the surface of the water when the weight is adjusted toward the rear end. The weight can also be shifted from one end of the body to the other when the body is reversed end for end.

Fig. 4 shows a modified form of body 1' having the wide portion 2' at one end, and the narrower portion 3' at the opposite end, said ends being inclined, as at 4' and 5'. In this form, however, the wide end 4' is of wedge-shape instead of being flat so as to move straighter, and is formed by converging the sides of the body to an inclined edge at said end. This will divide the water, to modify the lateral and vertical motion of the bait when the broad end is foremost.

Fig. 5 illustrates the use of a stationary weight 10' in the bottom portion of the body 1, when an adjustable weight is not wanted. The weight 10' comprises lead or other metal which is melted and poured into a recess 11' in the bottom of the body around the screw eye 15 or other anchor whereby the metal in solidifying will embed the screw eye or anchor it therein to firmly fasten the weight in place.

The top of the body can also have the same provision for the weight as the bottom so that the body can be turned upside down for use as a floating or skipping bait.

Having thus described the invention, what is claimed as new is:—

1. An artificial bait comprising a buoyant body having an inclined surface for causing the body to dive when pulled in the water, said body having a groove at the surface thereof into which an implement can be inserted to be moved longitudinally in said groove, a weight slidable in the groove to be moved by such implement, and a longitudinal strip extending along the groove and secured to the body, said strip bearing against the weight to frictionally hold the weight in adjusted position and permitting of the insertion of such implement into said groove for moving the weight.

2. An artificial bait comprising a buoyant body having an inclined surface for causing the body to dive when pulled in the water, said body having a longitudinal groove, a weight slidable in said groove, and a longitudinal strip secured to the body across the groove and bearing against the weight to frictionally hold the weight at different positions in said groove, and having a slot for the entrance of an implement for sliding the weight in said groove.

3. An artificial bait comprising a buoyant body whose opposite ends are inclined and each provided with means for the attachment of a line, whereby the body can be drawn through the water in either longitudinal direction by connecting the line to the corresponding end, each of said inclined ends, when disposed forwardly, causing the body to dive when pulled in the water, and said ends being different from one another whereby the diving motion is different in the two positions of the body, and a weight adjustable longitudinally in said body toward and away from said opposite inclined ends, for regulating the diving motion of the body in either position thereof.

4. An artificial bait comprising a buoyant body having its opposite ends inclined and each provided with means at different vertical positions for the connection of a line, each of said inclined ends causing the body to dive in the water when pulled with said end forward and said inclined ends being different from one another whereby to change the diving motion of the body when moved in opposite longitudinal directions according to which end the line is connected to.

In testimony whereof I have signed my name to this specification in the presence of two subscribing witnesses.

HENRY T. LEEPER.

Witnesses:
ANTHONY HUGHES,
CHAS. L. LOYD.